United States Patent
Daniel

(10) Patent No.: US 8,838,867 B2
(45) Date of Patent: Sep. 16, 2014

(54) SOFTWARE-BASED VIRTUAL PCI SYSTEM

(75) Inventor: David A. Daniel, Scottsdale, AZ (US)

(73) Assignee: Nuon, Inc., Scottsdale, AZ (US)

( * ) Notice: Subject to any disclaimer, the term of this patent is extended or adjusted under 35 U.S.C. 154(b) by 576 days.

(21) Appl. No.: 12/655,135

(22) Filed: Dec. 23, 2009

(65) Prior Publication Data

US 2010/0161872 A1 Jun. 24, 2010

Related U.S. Application Data

(60) Provisional application No. 61/203,633, filed on Dec. 24, 2008.

(51) Int. Cl.
*G06F 13/00* (2006.01)
*G06F 13/38* (2006.01)
*G06F 3/06* (2006.01)
*G06F 13/10* (2006.01)

(52) U.S. Cl.
CPC ............ *G06F 13/385* (2013.01); *G06F 3/0664* (2013.01); *G06F 13/105* (2013.01)
USPC ................... 710/313; 703/24; 703/25; 718/1

(58) Field of Classification Search
CPC .... G06F 3/0662; G06F 3/0664; G06F 13/105
USPC ................... 710/316, 313; 703/24, 25; 718/1
See application file for complete search history.

(56) References Cited

U.S. PATENT DOCUMENTS

| 7,650,275 | B2 * | 1/2010 | Herrell et al. ................... 703/25 |
| 8,117,372 | B2 * | 2/2012 | Daniel et al. ................... 710/315 |
| 2007/0038996 | A1 * | 2/2007 | Ben-Yehuda et al. ............ 718/1 |
| 2008/0294808 | A1 * | 11/2008 | Mahalingam et al. .......... 710/26 |

* cited by examiner

*Primary Examiner* — Glenn A Auve
(74) *Attorney, Agent, or Firm* — Robert C. Klinger

(57) ABSTRACT

A means for extending a PCI System of a host computer via software-centric virtualization. A Root Complex is virtualized at the host computer, and physically separated with a portion located remotely at an Endpoint, such as at a Remote Bus Adapter. One aspect of the invention avoids the need for a Host Bus Adapter. The invention utilizes 1 Gbps-10 Gbps or greater connectivity via the host's existing standard LAN adapter along with unique software to form the virtualization solution. The invention works within a host's PCI Express topology, extending the topology by adding an entire virtual I/O hierarchy via virtualization. The invention enables I/O virtualization in those implementations where a specialized host bus may not be desirable or feasible. Some examples of this may be a laptop computer, an embedded design, a cost-sensitive design, or a blade host where expansion slots are not available or accessible.

19 Claims, 12 Drawing Sheets

SOFTWARE-BASED VIRTUAL PCI SYSTEM

CLAIM OF PRIORITY

This application claims priority of U.S. Provisional Patent Application Ser. No. 61/203,633 entitled "SOFTWARE-BASED VIRTUAL PCI SYSTEM" filed Dec. 24, 2008, the teachings of which are incorporated herein by reference.

FIELD OF THE INVENTION

The present invention relates to PCI, PCI Express and virtualization of computer resources via high speed data networking protocols.

BACKGROUND OF THE INVENTION

Virtualization

There are two main categories of virtualization: 1) Computing Machine Virtualization 2) Resource Virtualization.

Computing machine virtualization involves definition and virtualization of multiple operating system (OS) instances and application stacks into partitions within a host system.

Resource virtualization refers to the abstraction of computer peripheral functions. There are two main types of Resource virtualization: 1) Storage Virtualization 2) System Memory-Mapped I/O Virtualization.

Storage virtualization involves the abstraction and aggregation of multiple physical storage components into logical storage pools that can then be allocated as needed to computing machines.

System Memory-Mapped I/O virtualization involves the abstraction of a wide variety of I/O resources, including but not limited to bridge devices, memory controllers, display controllers, input devices, multi-media devices, serial data acquisition devices, video devices, audio devices, modems, etc. that are assigned a location in host processor memory. Examples of System Memory-Mapped I/O Virtualization are exemplified by PCI Express I/O Virtualization (IOV) and applicant's technology referred to as i-PCI.

PCIe and PCIe I/O Virtualization

PCI Express (PCIe), as the successor to PCI bus, has moved to the forefront as the predominant local host bus for computer system motherboard architectures. A cabled version of PCI Express allows for high performance directly attached bus expansion via docks or expansion chassis. These docks and expansion chassis may be populated with any of the myriad of widely available PCI Express or PCI/PCI-X bus adapter cards. The adapter cards may be storage oriented (i.e. Fibre Channel, SCSI), video processing, audio processing, or any number of application specific Input/Output (I/O) functions. A limitation of PCI Express is that it is limited to direct attach expansion.

The PCI Special Interest Group (PCI-SIG) has defined single root and multi-root I/O virtualization sharing specifications.

The single-root specification defines the means by which a host, executing multiple systems instances may share PCI resources. In the case of single-root IOV, the resources are typically but not necessarily accessed via expansion slots located on the system motherboard itself and housed in the same enclosure as the host.

The multi-root specification on the other hand defines the means by which multiple hosts, executing multiple systems instances on disparate processing components, may utilize a common PCI Express (PCIe) switch in a topology to connect to and share common PCI Express resources. In the case of PCI Express multi-root IOV, resources are accessed and shared amongst two or more hosts via a PCI Express fabric. The resources are typically housed in a physically separate enclosure or card cage. Connections to the enclosure are via a high-performance short-distance cable as defined by the PCI Express External Cabling specification. The PCI Express resources may be serially or simultaneously shared.

A key constraint for PCIe I/O virtualization is the severe distance limitation of the external cabling. There is no provision for the utilization of networks for virtualization.

i-PCI

This invention builds and expands on applicant's technologydiscosed as "i-PCI" in commonly assigned copending U.S. patent application Ser. No. 12/148,712, the teachings of which are incorporated herein by reference. This patent application presents i-PCI as a new technology for extending computer systems over a network. The i-PCI protocol is a hardware, software, and firmware architecture that collectively enables virtualization of host memory-mapped I/O systems. For a PCI-based host, this involves extending the PCI I/O system architecture based on PCI Express.

The i-PCI protocol extends the PCI I/O System via encapsulation of PCI Express packets within network routing and transport layers and Ethernet packets and then utilizes the network as a transport. The network is made transparent to the host and thus the remote I/O appears to the host system as an integral part of the local PCI system architecture. The result is a virtualization of the host PCI System. The i-PCI protocol allows certain hardware devices (in particular I/O devices) native to the host architecture (including bridges, I/O controllers, and I/O cards) to be located remotely. FIG. 1 shows a detailed functional block diagram of a typical host system connected to multiple remote I/O chassis. An i-PCI host bus adapter card [101] installed in a host PCI Express slot [102] interfaces the host to the network. An i-PCI remote bus adapter card [103] interfaces the remote PCI Express bus resources to the network.

There are three basic implementations of i-PCI:

1. i-PCI: This is the TCP/IP implementation, utilizing IP addressing and routers. This implementation is the least efficient and results in the lowest data throughput of the three options, but it maximizes flexibility in quantity and distribution of the I/O units. Refer to FIG. 2 for an i-PCI IP-based network implementation block diagram.

2. i(e)-PCI: This is the LAN implementation, utilizing MAC addresses and Ethernet switches. This implementation is more efficient than the i-PCI TCP/IP implementation, but is less efficient than i(dc)-PCI. It allows for a large number of locally connected I/O units. Refer to FIG. 3 for an i(e)-PCI MAC-Address switched LAN implementation block diagram.

3. i(dc)-PCI. Referring to FIG. 4, this is a direct physical connect implementation, utilizing Ethernet CAT-x cables. This implementation is the most efficient and highest data throughput option, but it is limited to a single remote I/O unit. The standard implementation currently utilizes 10 Gbps Ethernet (802.3an) for the link [401], however, there are two other lower performance variations. These are designated the "Low End" LE(dc) or low performance variations, typically suitable for embedded or cost sensitive installations:

The first low end variation is LE(dc) Triple link Aggregation 1 Gbps Ethernet (802.3ab) [402] for mapping to single-lane 2.5 Gbps PCI Express [403] at the remote I/O.

A second variation is LE(dc) Single link 1 Gbps Ethernet [404] for mapping single-lane 2.5 Gbps PCI Express [405] on a host to a legacy 32-bit/33 MHz PCI bus-based [406] remote I/O.

A wireless version is also an implementation option for i-PCI. In a physical realization, this amounts to a wireless version of the Host Bus Adapter (HBA) and Remote Bus Adapter (RBA).

The i-PCI protocol describes packet formation via encapsulation of PCI Express Transaction Layer packets (TLP). The encapsulation is different depending on which of the implementations is in use. If IP is used as a transport (as illustrated in FIG. 2), the end encapsulation is within TCP, IP, and Ethernet headers and footers. If a switched LAN is used as a transport, the end encapsulation is within Ethernet data link and physical layer headers and footers. If a direct connect is implemented, the end encapsulation is within the Ethernet physical layer header and footer. FIG. 5 shows the high-level overall concept of the encapsulation technique, where TCP/IP is used as a transport.

This invention builds and expands on teachings introduced as "i-PCI" in commonly assigned copending U.S. patent application Ser. Nos. 12/148,712 and 12/286,796 the teachings of which are incorporated herein by reference.

SUMMARY OF THE INVENTION

The present invention achieves technical advantages by virtualizing the PCI System via a software-centric solution, hereafter referred to as "Soft i-PCI". The invention advantageously eliminates the host bus adapter and replaces it with a software construct that virtualizes a PCI Express Root Complex. Soft i-PCI enables i-PCI in those implementations where an i-PCI Host Bus Adapter may not be desirable or feasible.

DETAILED DESCRIPTION OF THE PRESENT INVENTION

The invention advantageously provides extending the PCI System of a host computer via software-centric virtualization. One aspect of the invention currently utilizes 1 Gbps-10 Gbps or greater connectivity via the host's existing LAN Network Interface Card (NIC) along with unique software to form the virtualization solution.

Soft i-PCI enables i-PCI in those implementations where an i-PCI Host Bus Adapter as described in commonly assigned U.S. patent application Ser. No. 12/148,712, may not be desirable or feasible. Some examples of this may be a laptop computer, an embedded design, a cost-sensitive design, or a blade host where PCI Express expansion slots are not available.

Memory-mapped I/O virtualization is an emerging area in the field of virtualization. PCI Express I/O virtualization, as defined by the PCI-SIG enables local I/O resource (i.e. PCI Express Endpoints) sharing among virtual machine instances.

Figure 1:
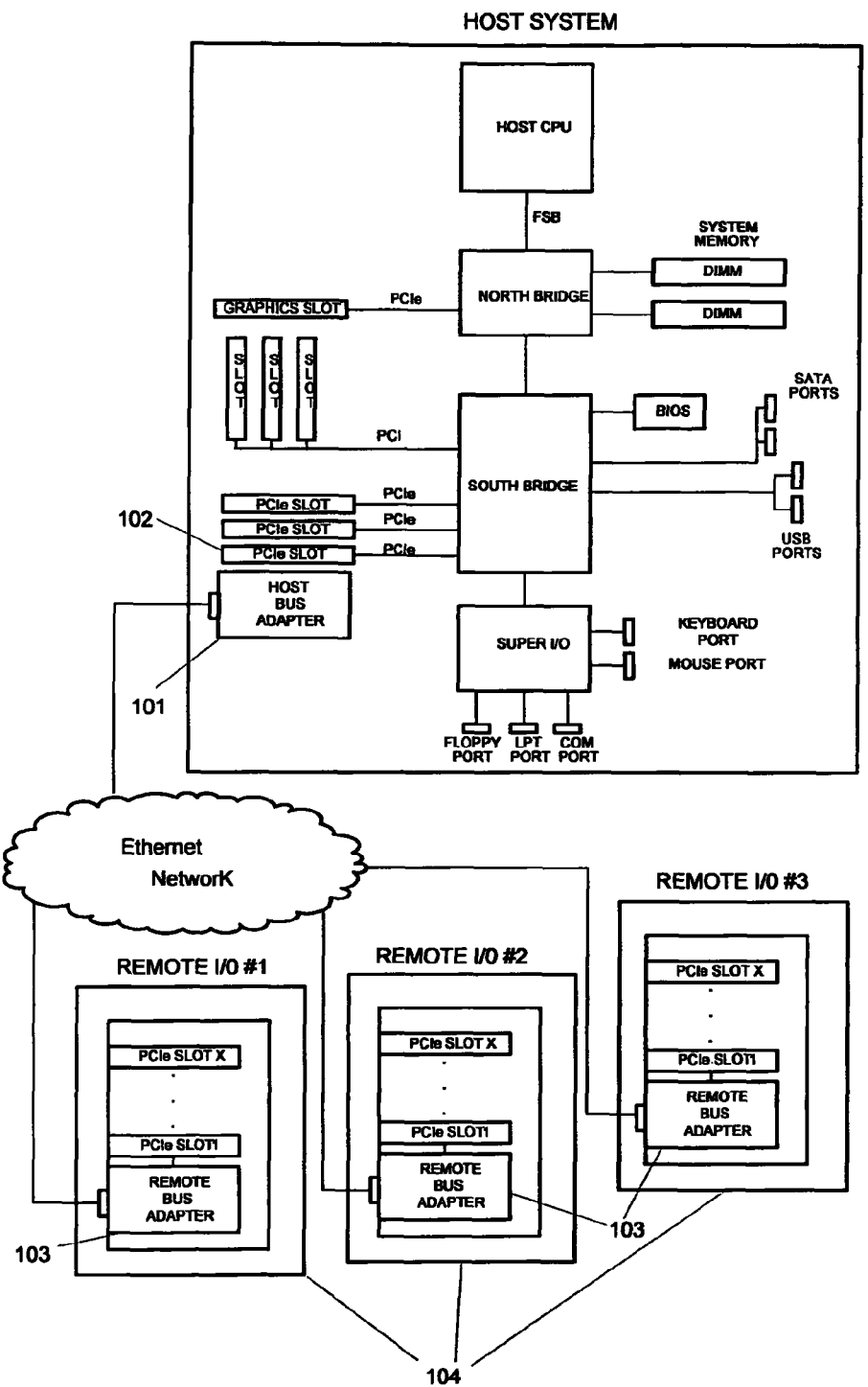
FIG. 1 shows a detailed functional block diagram of a typical host system connected to multiple remote I/O chassis implementing i-PCI.
Figure 2:
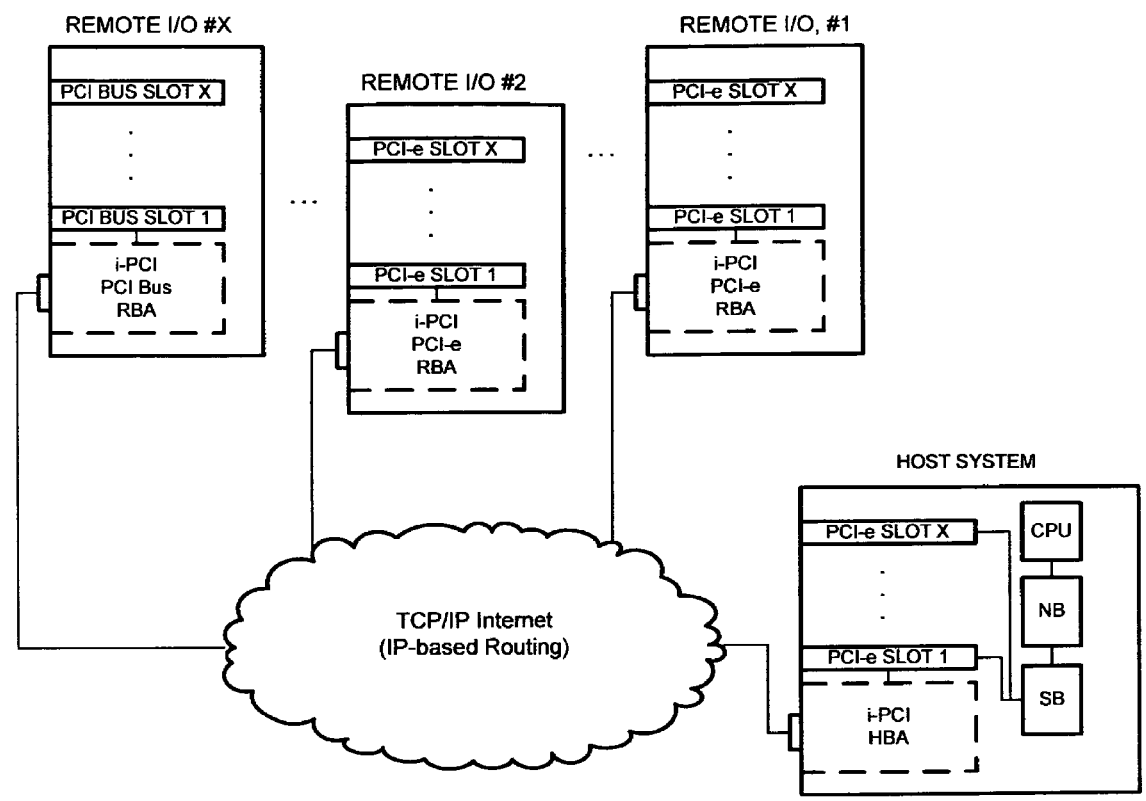
FIG. 2 is a block diagram of an i-PCI IP-based network implementation.
Figure 3:
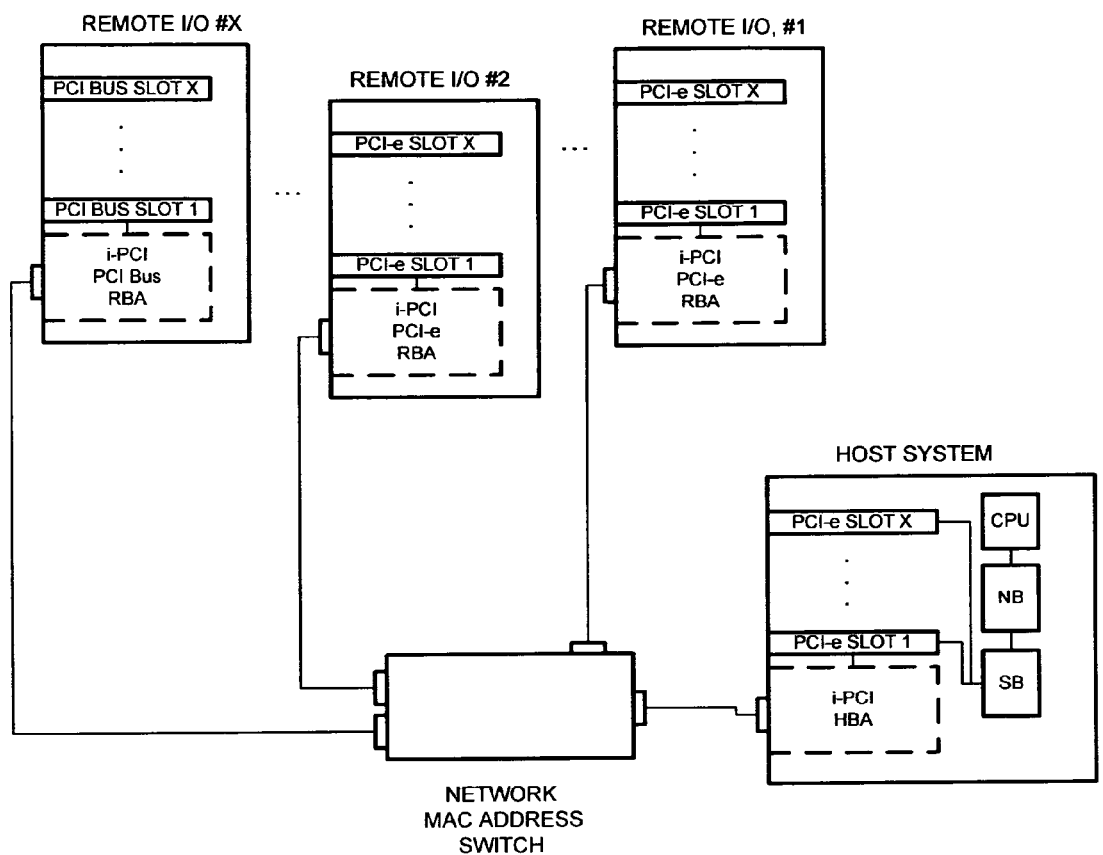
FIG. 3 is a block diagram of an, i(e)-PCI MAC-Address switched LAN implementation.
Figure 4:
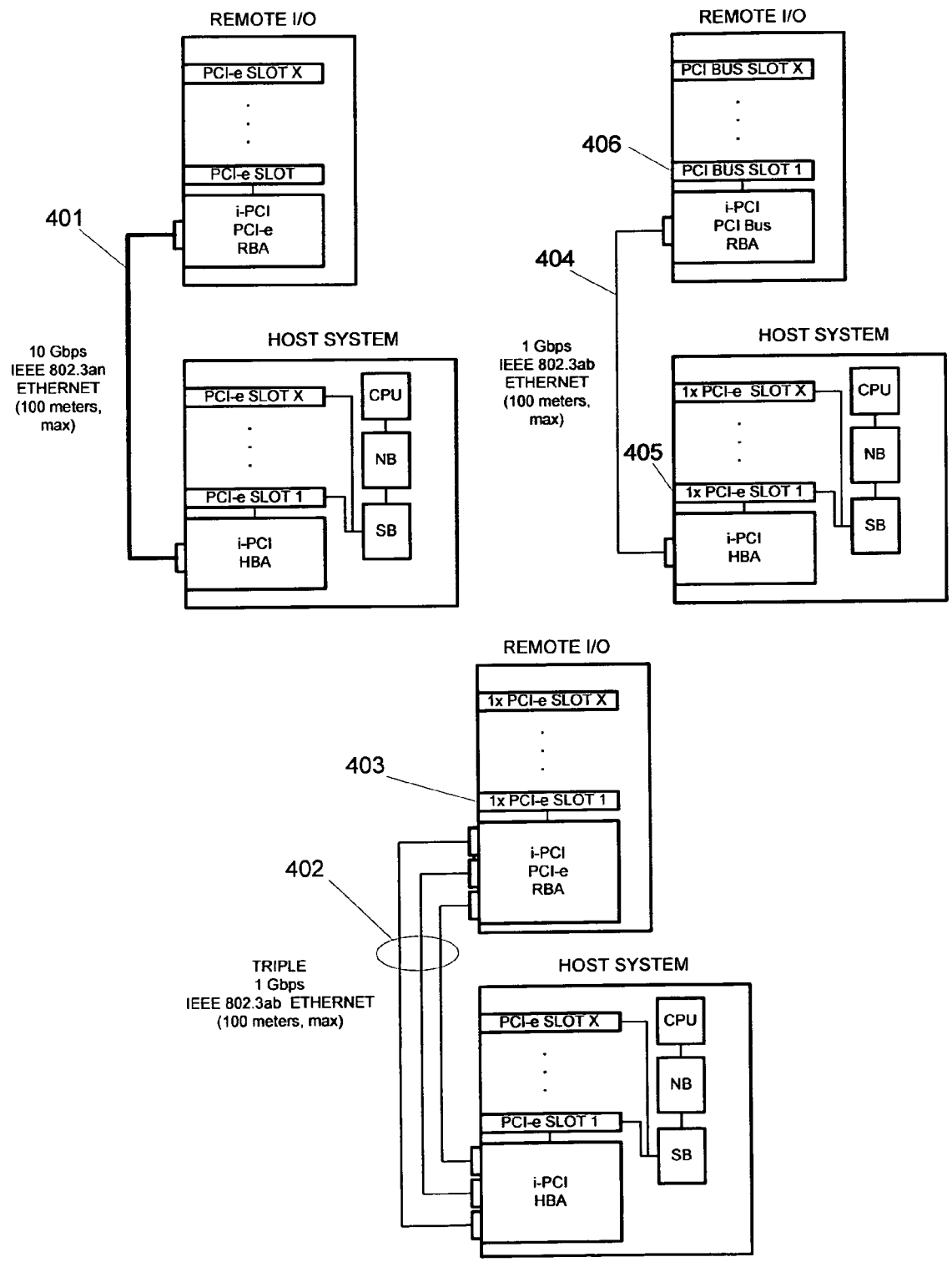
FIG. 4 is a block diagram of various direct physical connect i(dc)-PCI implementations, utilizing Ethernet CAT-x cables.
Figure 5:
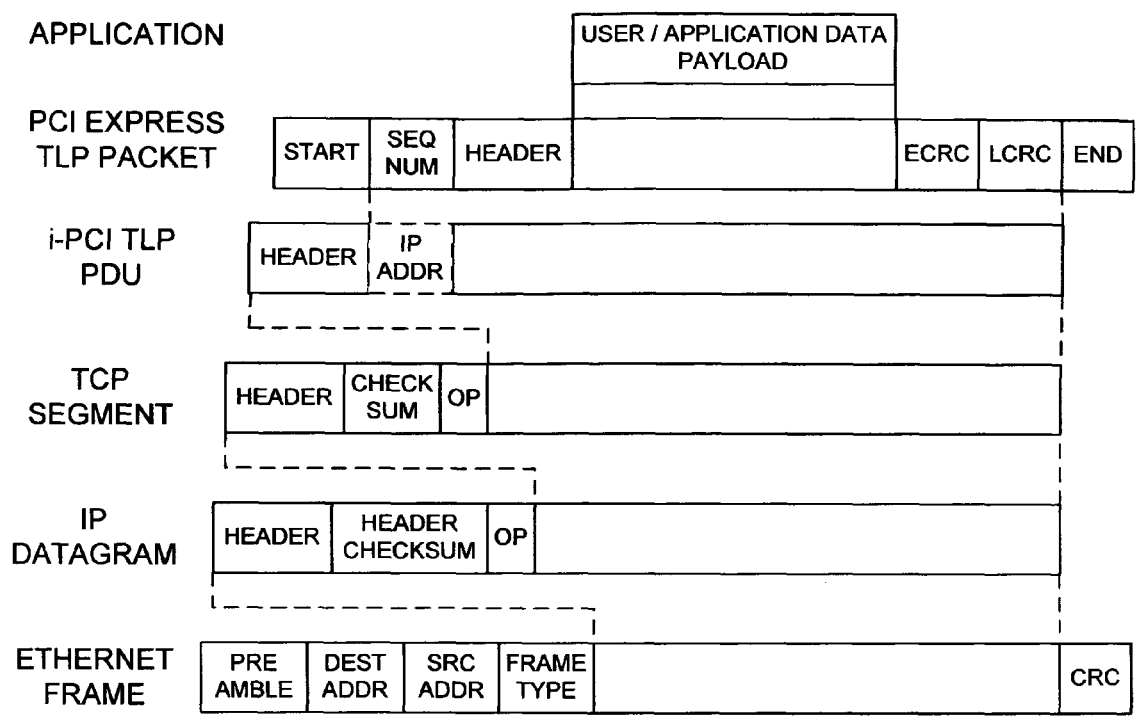
FIG. 5 is an illustrative diagram of i-PCI encapsulation showing TCP/IP used as transport.
Figure 6:
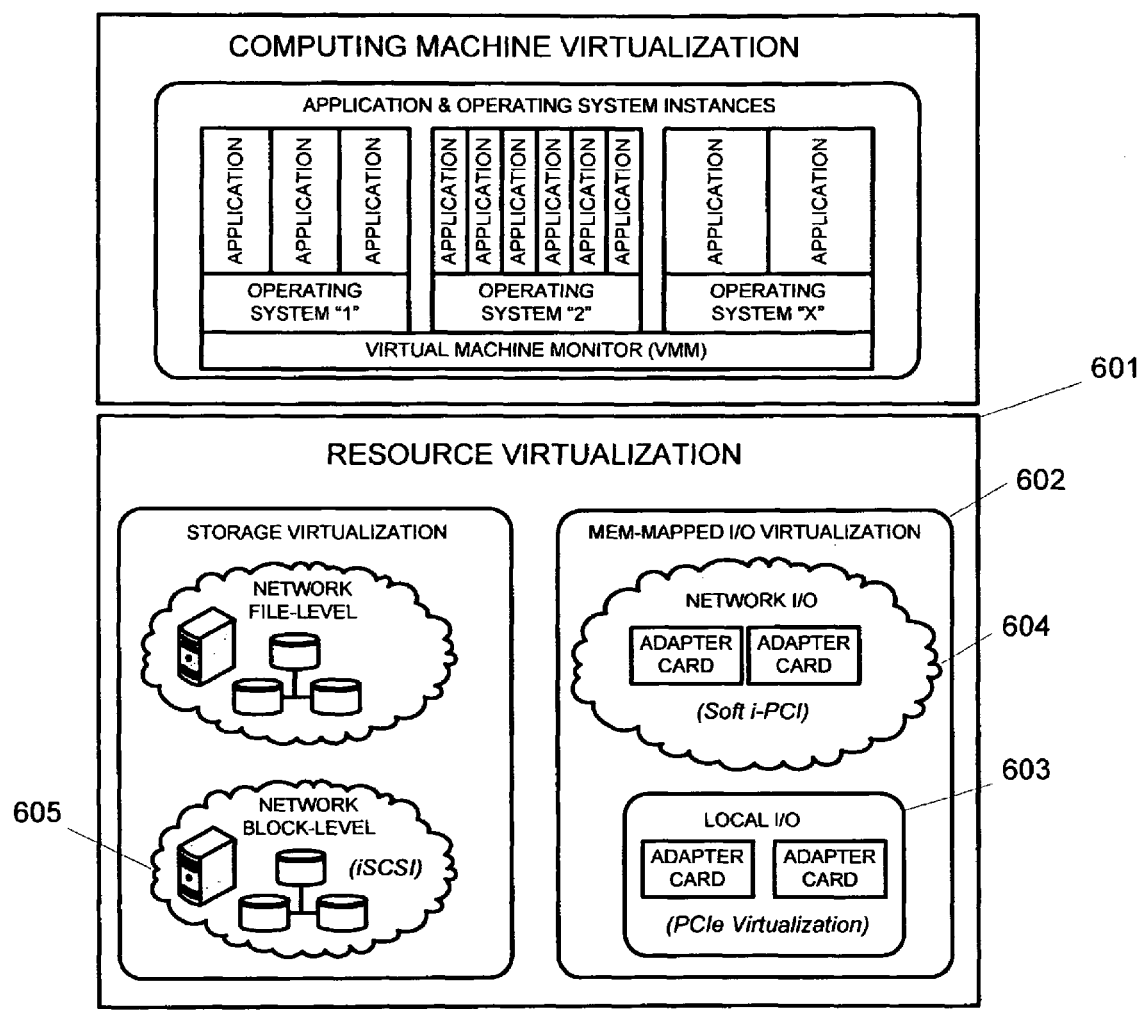
FIG. 6 is an illustration of where Soft i-PCI fits into the virtualization landscape.

Referring to FIG. 6, Soft i-PCI is shown positioned in the resource virtualization category [601] as a memory-mapped I/O virtualization [602] solution. Whereas PCI Express I/O virtualization is focused on local virtualization of the I/O [603], Soft i-PCI is focused on networked virtualization of I/O [604]. Whereas iSCSI is focused on networked block-level storage virtualization [605], Soft i-PCI is focused on networked memory-mapped I/O virtualization. Soft i-PCI is advantageously positioned as a more universal and general purpose solution than iSCSI and is better suited for virtualization of local computer bus architectures, such as PCI/PCI-X and PCI Express (PCIe). Thus, Soft i-PCI addresses a gap in the available virtualization solutions.

Figure 7:
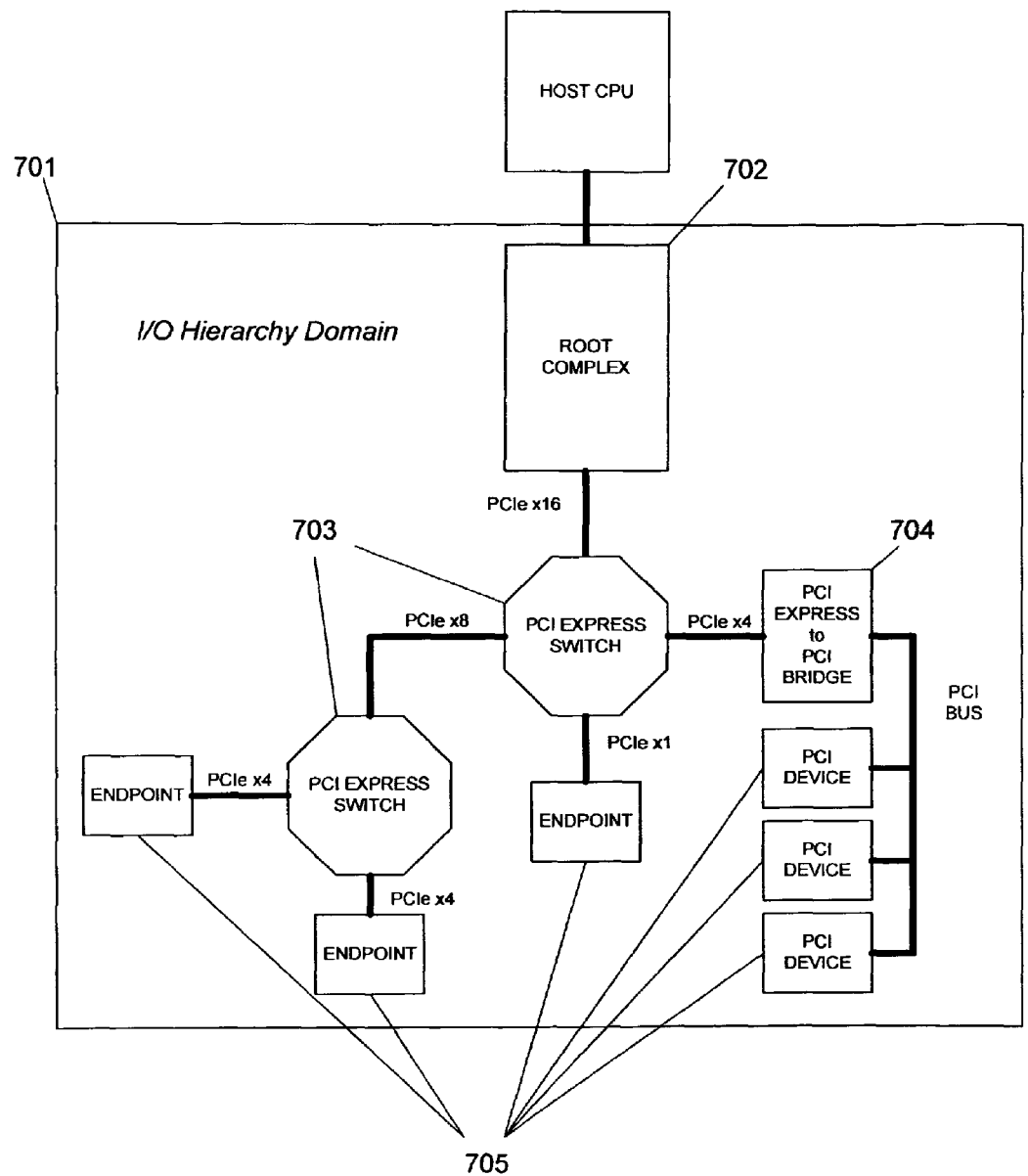
FIG. 7 is a block diagram showing the PCI Express Topology.

Referring to FIG. 7, the PCI Express fabric consists of point-to-point links that interconnect various components. A single instance of a PCI Express fabric is referred to as an I/O hierarchy domain [701]. An I/O hierarchy domain is composed of a Root Complex [702], switch(es) [703], bridge(s) [704], and Endpoint devices [705] as required. A hierarchy domain is implemented using physical devices that employ state machines, logic, and bus transceivers with the various components interconnected via circuit traces and/or cables.

Figure 8:
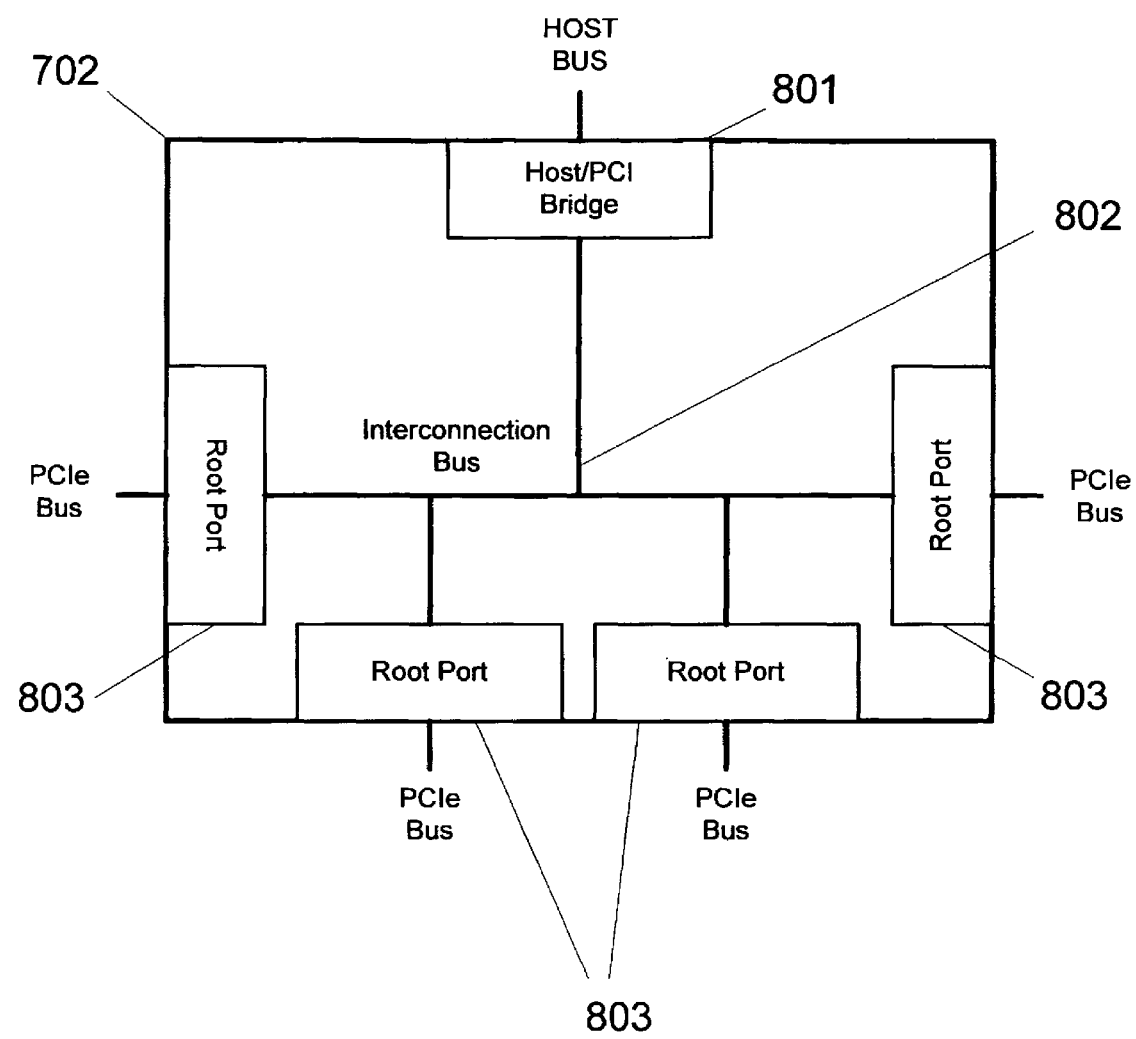
FIG. 8 is an example Root Complex block diagram.

The Root Complex [702] connects the CPU and system memory to the I/O devices. A Root Complex [702] is typically implemented in an integrated circuit or host chipset (North Bridge/South Bridge). Referring to FIG. 8, the Root Complex [702] consists of a Host/PCI Bridge [801] with an internal interconnection bus [802] to one or more downstream Root Ports [803]. The internal interconnection bus [802] is a non-defined bus, but is enumerated as Bus 0 by the PCI system software and appears to the host as if it were a regular numbered PCI bus.

Figure 9:
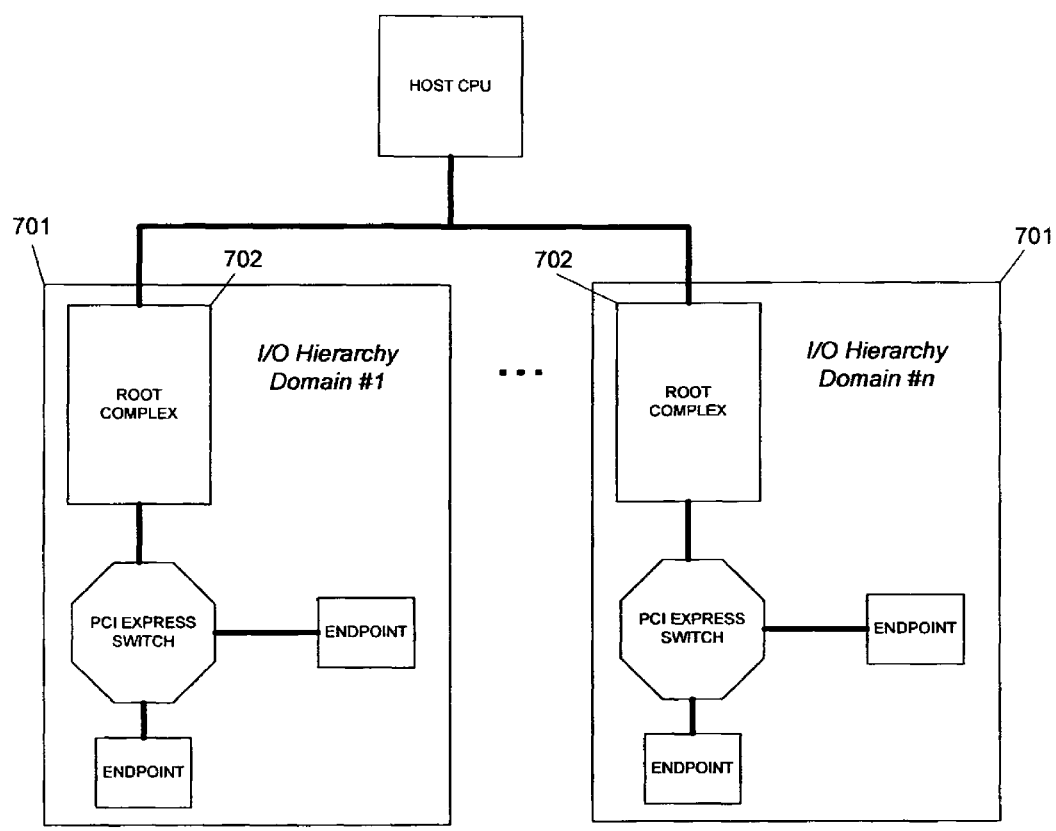
FIG. 9 is an illustration of PCI Express multiple root complex topology.

Referring to FIG. 9, a given host system may also be designed with more than one "peer" Root Complexes [702] resulting in multiple I/O hierarchies [701].

Figure 10:
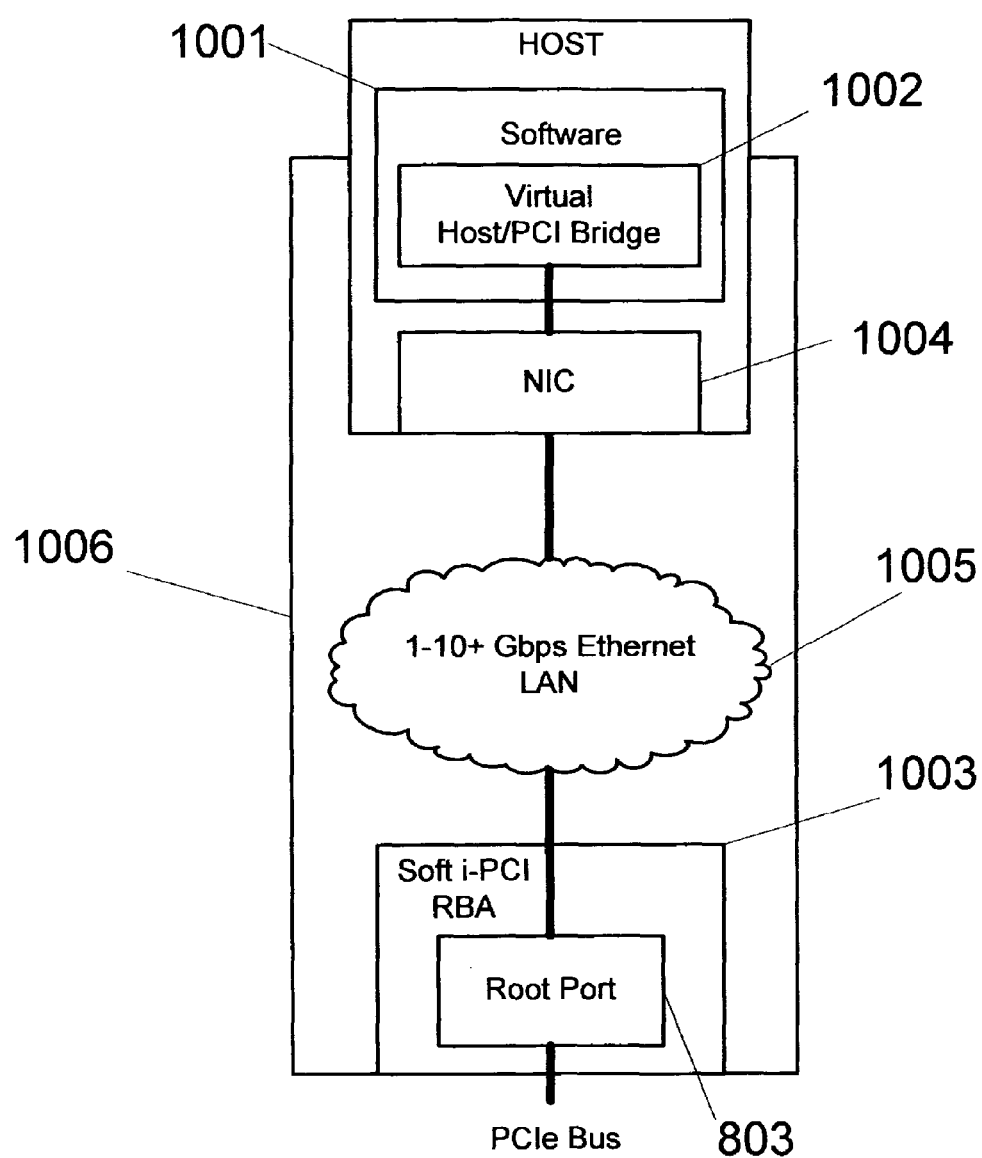
FIG. 10 shows a virtualized root complex.

One aspect of the invention includes creating one or more instances of virtual I/O hierarchies through software means, such that it appears to host CPU and Operating Systems that these virtual I/O hierarchies are physically present within the local host system, when in fact they are not. In actuality, a given virtual I/O hierarchy is a partial software construct or emulation, with the physical I/O located remote from the host CPU and Operating System, connected to the host via the host system's Network Interface Card (NIC) and a LAN. Referring to FIG. 10, the Host/PCI bridge [801] portion of the Root Complex [702] is emulated in the host software [1001] to create a virtual Host/PCI bridge [1002] and made to appear to the local host system as if part of a normal Root Complex. In addition, the downstream Root Port(s) [803] of the Root Complex are located remotely from the local host system, implemented in an i-PCI Remote Bus Adapter (RBA) [1003] that also provides network connectivity. In fact, in one preferred embodiment, the majority of the Root Complex functionality—as defined by the PCI Express specification—is located remotely in the RBA. The RBA for soft i-PCI is a design variation of the previously described i-PCI RBA [103]. The software [1001], Virtual Host/PCI Bridge [1002] emulation, NIC [1004], LAN [1005], soft i-PCI RBA [1003], and Root Port [803] collectively form a new complete "Virtual Root Complex" [1006], as a peer to the previously described local physical Root Complex (es) [701].

Figure 11:
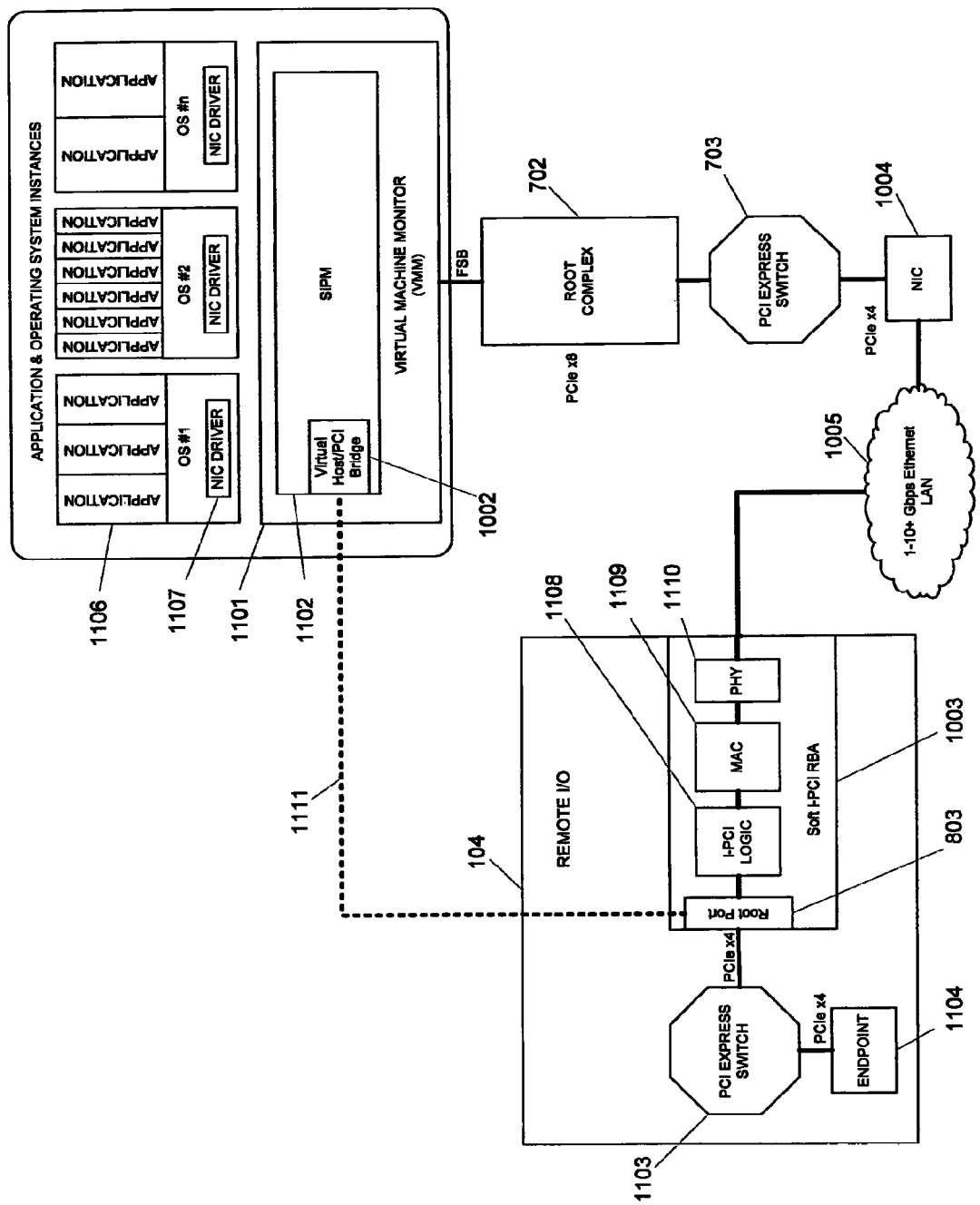
FIG. 11 shows a virtual I/O hierarchy.

Referring to FIG. 11, the Host/PCI Bridge portion of the Root Complex is a software construct or emulation written as an extension or enhancement to an existing available Virtual Machine Monitor (VMM) [1101] or hypervisor. This emulation software construct, designated the "Soft i-PCI PCI Manager" (SiPM) [1102], implements a virtual Host/PCI bridge [1002] and also manages the Host PCI topology such that the operating system and applications running on the host are unaware the I/O hierarchy actually extends over a network. Although implementation within an existing VMM is one preferred solution, other solutions are envisioned within the scope of the invention.

Advantageously, since the invention allows a pure software implementation of i-PCI on the host system, no additional network interface cards or hardware are required on the host. Instead, the SiPM [1102] sets up a construct such that a peer Root Complex appears to the host operating system. In the case of a transaction moving downstream from the host to an Endpoint [1104] located in the Remote I/O [104], the SiPM [1102] intercepts application layer data it receives and then re-maps the data to the NIC [1004]. The remapping is accomplished by routing to the NIC driver [1107] (as the case with i(dc)-PCI and i(e)-PCI implementations), or through a socket (in the case of i-PCI). The SiPM functions in a manner analogous (although not identical) to the HBA i-PCI Protocol Logic block as described in commonly assigned copending U.S. patent application Ser. No. 12/148,712 the teachings of which are incorporated herein by reference.

To illustrate how the SiPM is implemented, simplified data transfers between the host and remote I/O are described for the i(e)-PCI implementation:

Host Outgoing Traffic: A host application [1106] generates a request for PCI Express service that includes the PCI Express command to be performed, the memory-mapped address, the transaction type, the data payload size, and any data. This request passes from the application [1106] down to the VMM [1101]. The VMM [1101] includes the SiPM [1102]. The Virtual Root Complex Host/PCI bridge [1002] established by the SiPM [1102] has a window of memory addresses associated with the virtual Host/PCI Bridge [1002] and the remote I/O [104] (including PCI Express Switch [1103] and Endpoint [1104]). These memory addresses are stored in virtual Memory Base and Memory Limit registers (as defined by the PCI Express specification) within the host memory that acts as the registers. Any transactions that fall within this window are routed by the SiPM [1102] to the virtual Root Complex Host/PCI bridge [1002]. Upon receipt of these transactions, the bridge [1002] accepts the data as if it were a normal Host/PCI Root Complex bridge data transfer. The virtual bridge [1002] cross-references the PCI address to a MAC address for the remote I/O, using a pre-configured cross reference table. It then generates the MAC address that corresponds to the remote I/O [104] and returns the packet to the SiPM [1102]. The SiPM [1102] next re-generates the PCI Express service request only routing it either directly to the NIC [1004] itself on its downstream side, (it optionally has access to the NIC PCI Express address) or alternately back up to the OS NIC driver [1107]. The packet is then passed via PCI Express down through the physical root complex [702] and PCI Express Switch [703] to the NIC [1004]. Upon receipt, the NIC [1004] puts the MAC address in the Ethernet frame destination address field as it forms an Ethernet frame. The resulting frame is transmitted to the remote I/O [104] via Ethernet [1005].

Host Incoming Traffic: Upon receipt of the incoming packet, the NIC [1004] processes a frame received from the remote I/O [104] as it would any other received packet. The packet is then passed, via PCI Express, up through the PCI Express Switch [703] and physical root complex [702]. The VMM [1101] routes the packet to the downstream side of the SiPM [1102] and the packet is processed by the Virtual Host/PCI Bridge [1002] to extract the memory-mapped address, the transaction type, the data payload size, and any data. The resultant is passed up from the SiPM [1102] to the host target application [1106] via the NIC driver [1107].

Remote I/O Outgoing traffic: A remote I/O [104] Endpoint [1104] application generates a request for PCI Express service that includes the PCI Express command to be performed, the memory-mapped address, the transaction type, the data payload size, and any data. The PCI Express Endpoint [1104] generates the transaction and the Root Port [803] on the Soft i-PCI RBA [1003] receives it via the PCI Express Switch [1103]. The Root Port [803] decodes the PCI Express TLP header to confirm that it is intended for the host. Unless there is a fault condition, all traffic received on the link from downstream should be intended for the host. The packet and extracted PCI address is then processed by the soft i-PCI RBA [1003] i-PCI Logic [1108]. The i-PCI Logic [1108] cross-references the PCI address to a MAC address for the host, using a pre-configured cross reference table. It then generates the MAC address that corresponds to the host. The packet is then passed, along with the MAC address, to the RBA MAC [1109] and PHY [1110]. Upon receipt, the MAC [1109] takes the MAC address and puts it in the Ethernet frame destination address field as it forms an Ethernet frame. The resultant frame is then transmitted by the PHY [1110] to the host via Ethernet [1005].

Remote I/O Incoming Traffic: Upon receipt of the incoming frame, the PHY [1110] and MAC [1109] process the packet and extract the source MAC address. The MAC has a table of the valid MAC addresses of the authorized hosts. If the MAC address is verified, it is passed to the i-PCI Logic [1108] for processing. The i-PCI Logic [1108] then passes the resultant PCI Express packet to the Root Port [803] for transmission downstream to the intended endpoint [1104] via the PCI Express Switch [1103]. The packet is processed by the Endpoint [1104] to extract the memory-mapped address, the transaction type, the data payload size, and any data. The resultant is passed up to the Endpoint application.

The net effect of the described system is the creation of a "Virtual Root Complex Interconnection" [1111] resulting in a virtual I/O hierarchy. The interconnection combines the two physically separate portions of the virtual Root Complex (the host/PCI bridge and a root port) to form a complete virtual Root Complex. Said another way, a single Root Complex is physically split and separated across a serial datalink, and can be referred to as a split-Root Complex.

Figure 12:
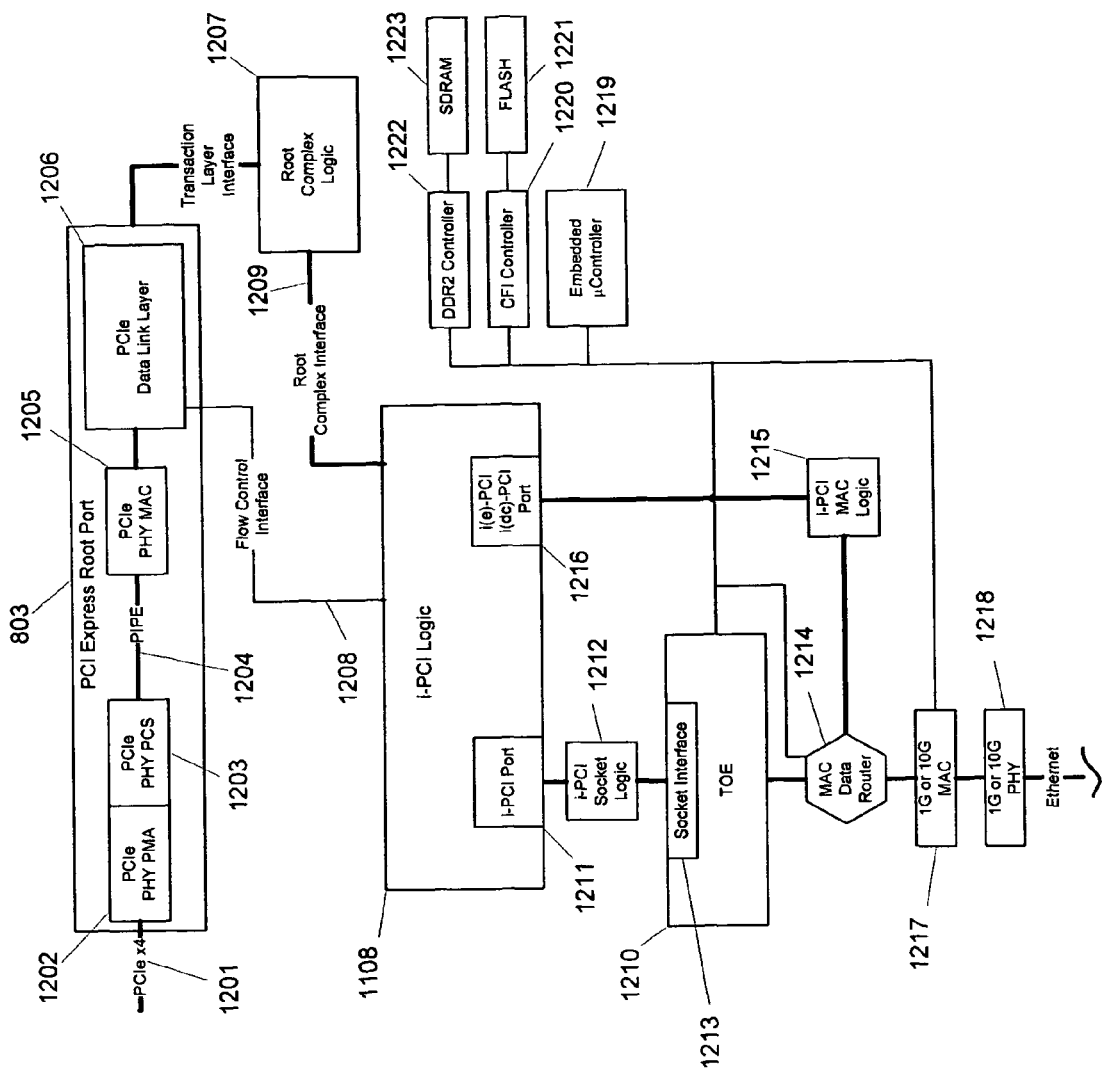
FIG. 12 is an illustration of the remote adapter architecture that implements the virtualized root complex and I/O hierarchy.

An illustration of the assembly architecture that supports the remote portion of a virtualized root complex [1001] is shown in FIG. 12. The PCI Express Root Port [803] interfaces to the host PCI Express upstream link [1201] via the PCIe PHY Physical Media Attachment Layer (PMA) [1202]. The PHY PMA contains the analog buffers and SERDES. The PHY PMA interfaces to the PHY Physical Coding Sub-layer (PCS) [1203] which notably contains the 8b/10b coding functionality. Together the PMA and PCS form the PHY transceiver commonly provided as an I/O block in higher end FPGAs. A PHY Interface for the PCI Express Architecture (PIPE) [1204] connects the PCS to the PCIe PHY MAC [1205]. The PCIe PHY MAC contains the state machines for link training and lane-lane deskew amongst other capability. The PCIe PHY MAC [1205] interfaces to the PCIe Data Link Layer logic [1206]. The PCI Express Data Link layer logic [1206] contains multiple functions including but not limited to PCIe link control, replay buffer, and link management all in compliance with the PCI Express specification requirements. The Data Link Layer [1206] interfaces to the Root Complex Logic [1207]. The Root Complex Logic implements standard PCI Express capabilities including hot plug controller, power management, interrupt handler, error detection and reporting and other functions as defined by the PCI Express Specification. The Root Complex Logic [1207] interfaces to the i-PCI Protocol Logic [1108]. There is a Flow Control Interface [1208] which allows the i-PCI logic [1108] access to Data Link Layer Packets (DLLPs) and the replay buffer to manage the flow control, as described in commonly assigned copending U.S. patent application Ser. No. 12/148,712. The main packet interface between the Root Complex Logic [1207] and the i-PCI Logic [1108] is the Root Complex Interface [1209].

The i-PCI Logic [1108] performs encapsulation/un-encapsulation per the i-PCI protocol. The i-PCI Logic [1108] interfaces the PCI Express Root Complex Logic [1207] to/from the TCP/IP Offload Engine (TOE) [1210] via the i-PCI port [1211], i-PCI Socket Logic [1212] and Socket Interface [1213]. The TOE [1210] works with the i-PCI Logic [1108] to maximize data throughput speeds for the i-PCI protocol. Alternatively, i(e)-PCI or i(dc)-PCI transactions are routed around the TOE via the MAC Data Router [1214], the i-PCI MAC Logic [1215], and the i(e)-PCI i(dc)-PCI port [1216]. Transactions are routed by MAC Data Router [1214] to the MAC [1217]. Transactions are translated to/from the network physical layer signaling by the PHY [1218].

Supporting management blocks include an embedded microcontroller [1219] for configuration and status capabilities, a CFI controller [1220] for interfacing to non-volatile flash memory [1221] and a DDR2 SDRAM memory controller [1222] for interfacing to SDRAM [1223] utilized by the embedded microcontroller.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A non-transitory computer readable medium having instructions operable with a local host system having a host CPU and an operating system, comprising:
   instructions executable on the local host system configured to provide one or more I/O hierarchies comprising virtual I/O hierarchies through software means, wherein the I/O hierarchies are configured to appear to the host CPU and the operating system as being physically present within the local host system;
   wherein a first set of said instructions are configured to be executed locally at the host CPU and a second set of said instructions are configured to be executed remotely on a network.

2. The computer readable medium as specified in claim 1 wherein the first set of said instructions and the second set of said instructions comprises a Root Complex.

3. The computer readable medium as specified in claim 1 further comprising:
   instructions operable to implement a Host/PCI bridge portion of a Root Complex as a software emulation, configured to appear as part of the Root Complex, and configured to manage a Host PCI topology such that the operating system and applications running on the local host system are unaware that one said I/O hierarchy is a virtual I/O hierarchy;
   instructions operable with a NIC configured to interface to the network;
   instructions operable with a virtualization protocol configured to utilize the NIC and implement a network transport;
   instructions operable with a remote assembly configured to adapt the network to a balance of the Root Complex, including a Root port;
   instructions operable with a local assembly, the local assembly and the remote assembly together forming a complete Root Complex functionality; and
   instructions operable with switches and endpoints located at the remote assembly operable with at least one said virtual I/O hierarchy.

4. The computer readable medium as specified in claim 3 wherein the at least one I/O virtual hierarchy is operable with the local host system without a physical network adapter.

5. The computer readable medium as specified in claim 3 wherein the network transport is defined by an Internet Protocol Suite.

6. The computer readable medium as specified in claim 5, wherein the network transport is TCP/IP.

7. The computer readable medium as specified in claim 3, wherein the network transport is a LAN.

8. The computer readable medium as specified in claim 7, wherein the LAN is an Ethernet.

9. The computer readable medium as specified in claim 3, where the network transport is a direct connect arrangement configured to utilize an Ethernet physical layer as a transport link, without consideration of a MAC hardware address or any interceding external Ethernet switch.

10. The computer readable medium as specified in claim 3, wherein the network transport is a wireless transport and the local assembly and remote assembly(s) include a radio platform.

11. The computer readable medium as specified in claim 3 wherein the instructions comprise a virtualization protocol.

12. The computer readable medium as specified in claim 3 wherein the Host/PCI Bridge portion of the Root Complex is a software construct or emulation written as an extension or enhancement to an existing available Virtual Machine Monitor (VMM) or hypervisor.

13. The computer readable medium as specified in claim 3 wherein a majority of the Root Complex functionality is located remotely in a remote bus adapter.

14. A non-transitory computer readable medium having instructions operable with a local host system having a host CPU and an operating system, comprising:
   instructions executable on the local host system configured to provide one or more I/O hierarchies comprising virtual I/O hierarchies through software means, wherein the I/O hierarchies are configured to appear to the host CPU and the operating system as being physically present within the local host system; and
   instructions operable with a construct configured such that a peer Root Complex appears to the host CPU operating system.

15. A non-transitory computer readable medium having instructions operable with a local host system having a host CPU and an operating system, comprising:

instructions executable on the local host system configured to provide one or more I/O hierarchies comprising virtual I/O hierarchies through software means, wherein the I/O hierarchies are configured to appear to the host CPU and the operating system as being physically present within the local host system; and instructions configured to intercept received application layer data and then re-map the data to a NIC.

16. The computer readable medium as specified in claim 15 further comprising instructions configured to remap the data by routing to the NIC or through a socket.

17. A non-transitory computer readable medium having instructions operable with a local host system having a host CPU and an operating system, comprising:

instructions executable on the local host system configured to provide one or more I/O hierarchies comprising virtual I/O hierarchies through software means, wherein the I/O hierarchies are configured to appear to the host CPU and the operating system as being physically present within the local host system; and instructions configured to encapsulate/un-encapsulate packet data using a virtualization protocol.

18. The computer readable medium as specified in claim 17 further comprising instructions configured to interface PCI Express Root Complex data to/from a TCP/IP Offload Engine (TOE) via a port or socket.

19. The computer readable medium as specified in claim 17 further comprising instructions configured to route PCI transactions around a TCP/IP Offload Engine via a MAC Data Router to a MAC.

* * * * *